United States Patent Office 3,240,615
Patented Mar. 15, 1966

3,240,615
REFRACTORY
Jacques R. Martinet, 1964 Abinante Lane,
San Jose, Calif.
No Drawing. Filed Sept. 26, 1963, Ser. No. 311,632
4 Claims. (Cl. 106—59)

This invention concerns refractory compositions and particularly basic or nonacid compositions suitable for casting.

In recent years, it has become the practice in many instances to make refractory structures (e.g., for high temperature metallurgical furnaces and the like) of a cast monolith rather than of individual bricks bonded by mortar or metal. This practice is particularly useful in making up shapes of relatively complex form, as for example furnace doors, for which it would be quite expensive to mold or cut brick to the particular shapes required. A cast refractory structure is not only generally less expensive than a built-up brick one from the point of view of labor costs and construction time involved, but also has the advantage that there are no mortar joints to be attacked by slags, hot gases, or other corrosive or erosive influences.

A composition suitable for a castable must have not only the ability to set up to a hard, coherent mass at room temperature, but must also exhibit strength and temperature resistance at the operating temperature of the furnace or other device in which it is used. It must also be able to resist mechanical forces and the effects of rapid changes in temperature. Thus, for example, the door of an open hearth furnace is subjected to rapid and relatively wide temperature fluctuations whenever it is opened. It may also be subject to mechanical bumping and jarring.

Present-day refractory castable mixes, particularly when used for making open hearth furnace doors, show a tendency toward peeling or spalling or erosion at the hot face of the refractory. Peeling results in unduly rapid removal of refractory from the hot face and necessitates relatively frequent replacement of the refractory. In peeling, relatively large pieces of refractory part from the main body of refractory. These pieces are believed to be broken off by a combination of mechanical and thermal stresses in the material.

It has now been discovered that a superior refractory castable mix, one which overcomes the mentioned shortcomings, is obtained when the mix includes at least about 15% by weight, and preferably from about 20% to about 25% by weight, of magnesia grain of a size retained on a 4 mesh screen. It is preferred that at least 15% by weight of the mix be particles of magnesia greater than ⅜″. At least 40% and preferably about 50% or more of the total weight of the mix should be made up of magnesia. Preferably at least about 90% of the magnesia should be retained on a 30 mesh screen. In addition, the mix should contain from about 20% to about 50%, preferably about 35%, of chromite ore. This chromite ore should be more finely divided than the magnesia material, and preferably is substantially all less than about 35 mesh.

The magnesia is a dead burned magnesia such as calcined natural or synthetic magnesite or synthetically prepared periclase obtained from sea water or naturally occurring inland brines (e.g., by treatment thereof with an alkaline precipitant such as lime, calcined dolomite, and the like). Suitable magnesias generally have at least 70% MgO content, the balance being naturally occuring impurities or materials added to densify the magnesia grain during its production including, e.g., $Cr_2O_3$, $SiO_2$, $Al_2O_3$, $V_2O_5$, CaF, and the like. Magnesias of high purity, and containing at least 95% MgO, are particularly preferred.

Chromite is a naturally occurring ore made up of spinel crystals containing mixed $Al_2O_3$, $Cr_2O_3$, MgO., and FeO as principal components, the spinel crystals being bonded together by a siliceous matrix. Exemplary of such material is a Philippine chromite having the following typical chemical analysis:

| | Percent by weight |
|---|---|
| $SiO_2$ | 4.5 |
| FeO | 12.0 |
| $Al_2O_3$ | 28.0 |
| $Cr_2O_3$ | 29.7 |
| CaO | 0.7 |
| MgO | 25.1 |

The castable mix of this invention also advantageously contains a cold or chemical bond or cement or binder, such as sodium silicate, in an amount from about 2% to about 10% of the total batch. Any of various commercially available sodium silicates of different $Na_2O:SiO_2$ ratios can be used. Other room temperature cements or binders well known in the art, such as Sorel cement, calcium aluminate cement, or chromic acid and the like, can be used.

The mix also advantageously includes one or more fluxes, i.e., materials which will assist in forming a ceramic bond at the temperature at which the refractory article is to be used. One such material which is particularly useful in this invention is free, or added, iron oxide, such as FeO, $Fe_2O_3$, or the common iron oxide of commerce known as mill scale. (The added iron oxide flux is referred to as "free" to distinguish it from the iron oxide contained in the chromite ore.) Other fluxes which may be used are alumina $Al_2O_3$) which is finely divided (preferably 90% less than 325 mesh) and silica ($SiO_2$) flour (preferably substantially all less than 200 mesh). These, and other fluxes well-known in the art, can be used alone or in admixture with each other in amount of from about 1% to 10% of the total batch weight. As is well known, the presence of fluxes decreases the refractoriness of the composition and accordingly it is preferred that not over 5% of any one fluxing material be used.

The composition of this invention is particularly advantageous for use as a casting mix in that when so used it provides a monolithic refractory which shows particular resistance to shrinking at the hot face and to peeling or erosion. The mix of this invention is advantageously used in casting such furnace parts as the doors of open hearth furnaces.

The following examples are illustrative of refractory mixes within the scope of this invention:

Example I

| | Parts by weight |
|---|---|
| Periclase | 50 |
| Chromite | 35 |
| Mill scale | 5 |
| Alumina | 4 |
| Silica flour | 3 |
| Sodium silicate | 3 |

The sodium silicate was one wherein the $Na_2O:SiO_2$ ratio was 1:3.22 and was in the form of a powder. Of the total weight of the batch, 24% was periclase retained on a 4 mesh screen, 18.2% was periclase retained on a ⅜″ screen, 10.8% was periclase retained on a ½″ screen, 3.3% was periclase retained on a ¾″ screen, and .7% was periclase retained on a 1″ screen. Substantially all the chromite passed a 40 mesh screen. Substantially all the mill scale passed a 150 mesh screen. Substantially all the alumina and silica flour passed through a 200 mesh screen.

In the above example, the periclase was a material produced from sea water. To the periclase was added about ¼% $Cr_2O_3$ as mineralizer, according to the teachings of U.S. Patent 2,487,289, issued November 8, 1949, in the names of L. W. Austin et al. The chromite was a Philippine chromite as described above.

As an example of the use of the compositions of this invention, the composition of Example I was mixed with 8% water and the mixture poured into the door of an open hearth furnace. After setting and drying, this door was tested by being placed in service in the number 5 door position of an open hearth furnace, where it was used for 168 heats.

*Example II*

| | Parts by weight |
|---|---|
| Periclase | 46.2 |
| Chromite | 46.2 |
| Sodium silicate | 3.1 |
| $Fe_2O_3$ | 4.5 |

Over 50% of the periclase was coarser than 4 mesh, the chromite all passed a 40 mesh screen, and the $Fe_2O_3$ was −100 mesh. The sodium silicate was one wherein the $Na_2O:SiO_2$ ratio was 1:2.

*Example III*

| | Parts by weight |
|---|---|
| Periclase | 50 |
| Chromite | 41.5 |
| Mill scale | 5 |
| Sodium silicate | 3.5 |

The major portion (i.e., over 50%) of the periclase was of a size passing a ¾ inch screen and retained on a 4 mesh screen. Approximately half the chromite passed a 40 mesh screen and was retained on a 100 mesh screen, the remainder passing through a 100 mesh screen. The mill scale passed a 100 mesh screen. The sodium silicate was one wherein the $Na_2O:SiO_2$ ratio was 1:2.

*Example IV*

The composition was the same as that in Example III except that the major portion of the periclase was between ⅜″ and 4 mesh size, rather than between ¾″ and 4 mesh size.

In practice, the above mixtures will be made up by a refractories manufacturer and shipped in the dry state to the user, who will add water to the mix to make a pourable slurry, as is well known in the art. Generally, an amount of water sufficient to make a pourable casting mass, especially from 6% to 10% of the weight of the dry materials is used. The slurry will then be poured into prepared molds (e.g., the steel frame of an open hearth door) and allowed to harden and dry throughly before being put to use. Vibration of the poured mass can be used to achieve greater density.

A comparison of test specimens prepared from the mixes of Examples III and IV illustrates the advantages of having coarser magnesia material present in the mix. Mixes of these two compositions were combined with 8% water, cast into test specimens in steel cases to form cubes 6 inches on a side, and allowed to harden. After thorough drying, each specimen was tested by placing it in a furnace so that its hot face was at a temperature of about 1670° C. and its cold face exposed to ambient or room temperature. The test temperature was held for 8 hours. After removal from the test furnace, the specimen made from the mix of Example IV had peeled back a distance of 2 inches from the original hot face, whereas the specimen made from the mix of Example III showed virtually no peeling, there being actually an increase in thickness due to absorption of iron from the steel case.

In the specification and claims, parts and percentages are given by weight unless otherwise specified. Screen sizes given herein are those of Tyler screens as defined on page 1719 of Chemical Engineers' Handbook, John H. Perry, 2nd edition, 1941, published by McGraw-Hill Book Co. The term "castable" or "cast" in this application is intended to refer to and describe a composition which will flow or can be shaped to a desired form or to the form of a container or support under its own weight, or by vibration, or under only moderate pressure, and which substance subsequently hardens to form a strong shape or structure; and is to be distinguished from fused or molten casting of materials which have been heated to high temperatures to enable casting of a molten material.

Having now described the invention, what is claimed is:

1. A refractory composition consisting essentially of from about 20% to about 50% by weight chromite, from about 2% to about 10% of a binder, the remainder being essentially magnesia present in an amount of at least 40% by weight of the total composition, at least 15% of the total weight of the composition consisting of particles of magnesia larger than ⅜″ and substantially all of said chromite passing a 35 mesh screen.

2. A refractory castable composition consisting essentially of from about 20% to about 50% by weight chromite, from about 2% to about 10% of a binder, and from about 1% to about 10% by weight of at least one flux, the balance of the composition being essentially magnesia present in an amount of at least 40% by weight of the total composition, at least 15% of the total weight of the composition consisting of particles of magnesia larger than ⅜″ and substantially all of the chromite passing a 35 mesh screen.

3. A castable refractory composition consisting essentially of from about 20% to about 50% by weight chromite, from about 1% to about 10% mill scale, from about 1% to about 10% finely divided alumina, from about 1% to about 10% silica flour, and from about 2% to about 10% sodium silicate, the balance being essentially magnesia present in an amount of at least 40% by weight of the total composition, at least 15% of the total weight of the composition consisting of particles of magnesia larger than ⅜″, a major portion of the magnesia being retained on a 30 mesh screen, and substantially all of said chromite passing a 35 mesh screen.

4. A refractory composition consisting essentially of 50% by weight periclase, 35% chromite, 5% mill scale, 4% alumina, 3% silica flour, and 3% sodium silicate, 48% of the periclase being retained on a 4 mesh screen and substantially all the chromite passing a 40 mesh screen.

References Cited by the Examiner

UNITED STATES PATENTS

| 3,030,216 | 4/1962 | Chantler et al. | 106—59 |
| 3,093,497 | 6/1963 | Demaison | 106—59 |

TOBIAS E. LEVOW, *Primary Examiner.*

J. E. POER, *Assistant Examiner.*